A. A. TIBBITS.
TRACTOR.
APPLICATION FILED MAY 18, 1918.
1,306,644.
Patented June 10, 1919.
2 SHEETS—SHEET 1.
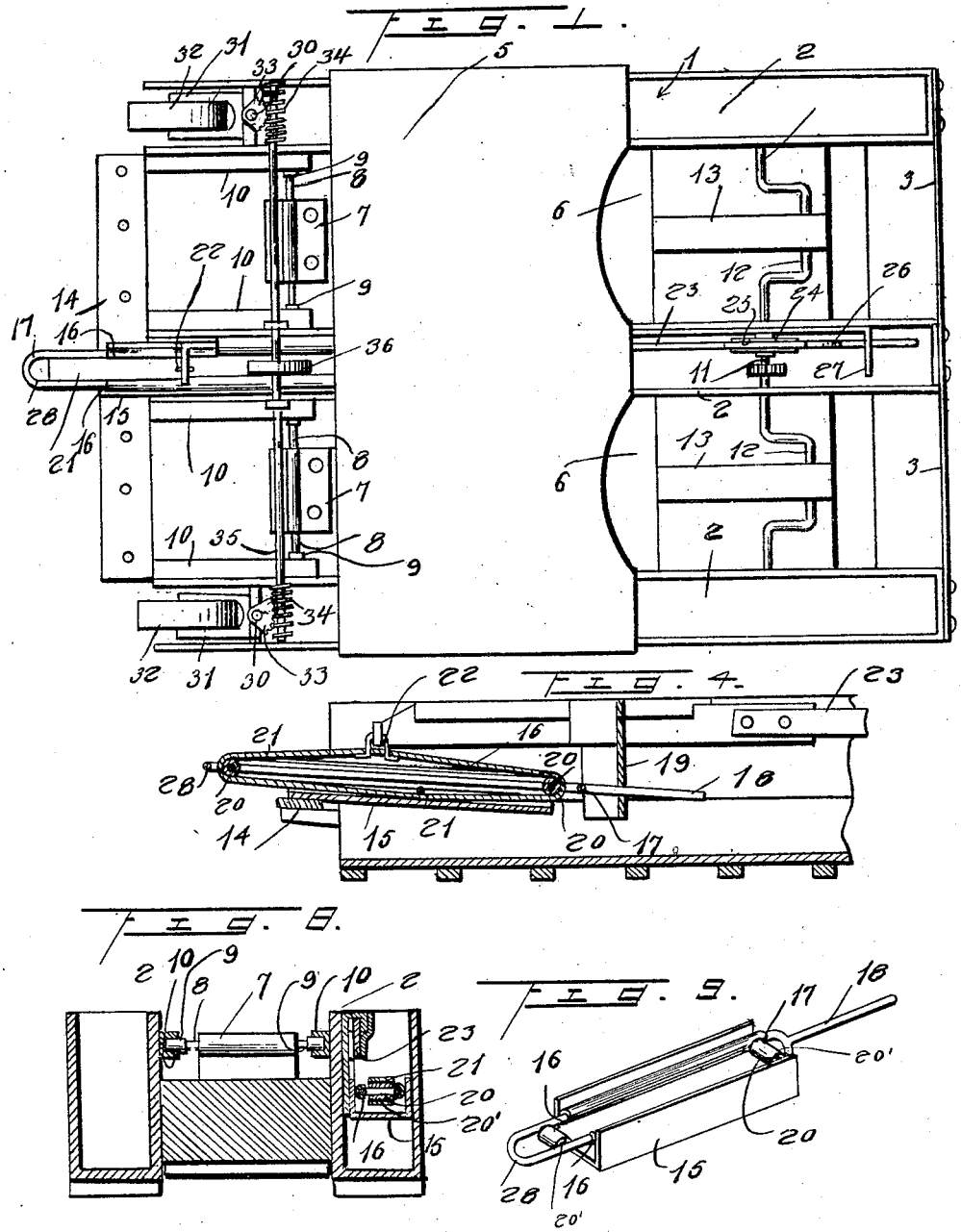
Inventor
A. A. Tibbits.
By
Attorney A. A. TIBBITS.
TRACTOR.
APPLICATION FILED MAY 18, 1918.
1,306,644.
Patented June 10, 1919.
2 SHEETS—SHEET 2.
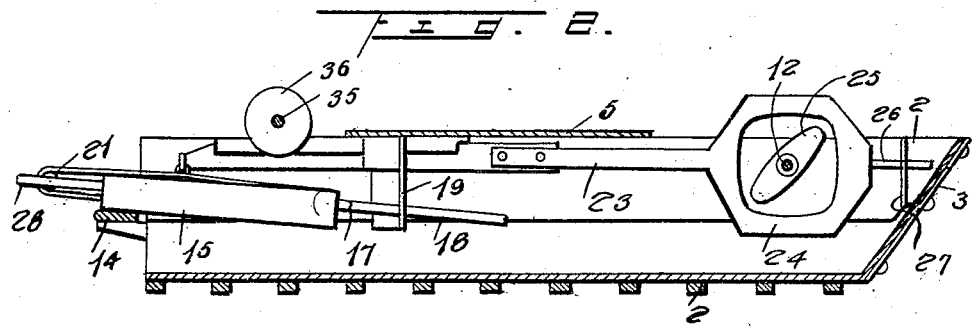
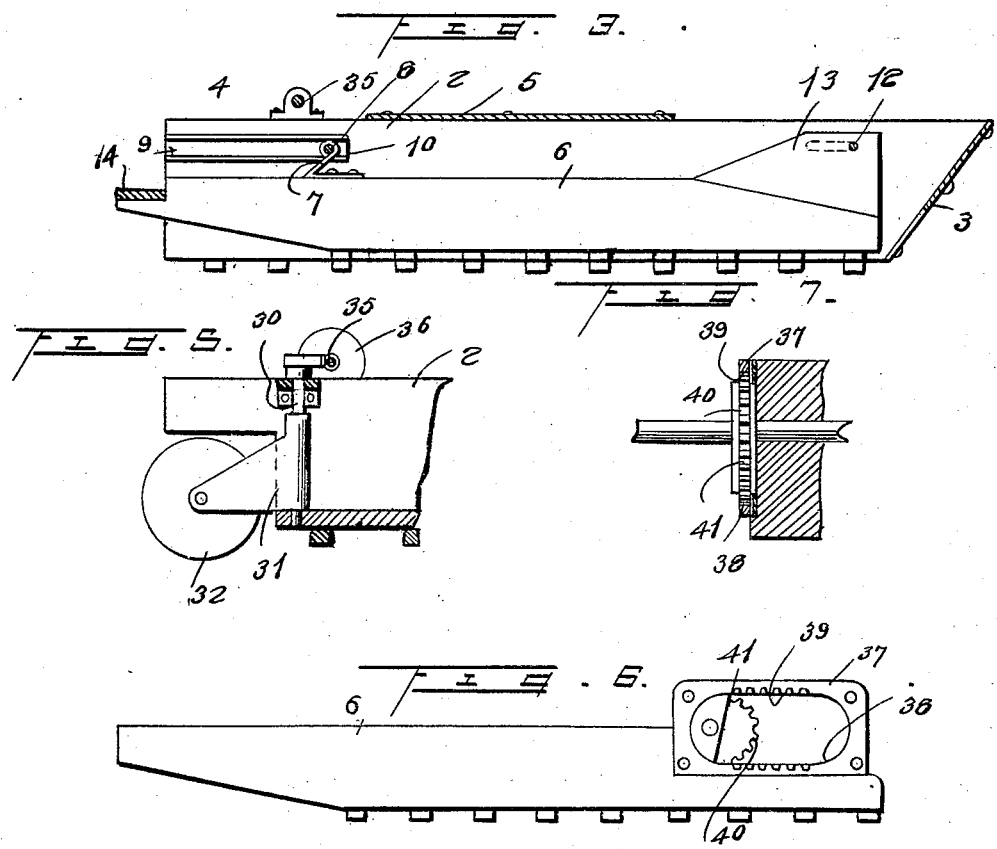
Inventor
A. A. Tibbits.

UNITED STATES PATENT OFFICE.

ARMAND A. TIBBITS, OF OMAHA, NEBRASKA.

TRACTOR.

1,306,644.  Specification of Letters Patent.  Patented June 10, 1919.

Application filed May 18, 1918. Serial No. 235,323.

*To all whom it may concern:*

Be it known that I, ARMAND A. TIBBITS, a citizen of the United States, residing at Omaha, in the county of Douglas and State of Nebraska, have invented certain new and useful Improvements in Tractors; and I do hereby declare the following to be a full, clear, and exact description of the invention, such as will enable others skilled in the art to which it appertains to make and use the same.

This invention relates to improvements in tractors and more particularly to a novel traction means therefor and has for one of its objects the provision of a device of this character which can travel upon extremely uneven surfaces or ground and one which will have a comparatively large draft power.

Another object of this invention is the provision of steppers or members adapted to be moved upwardly, forwardly and downwardly to move the tractor forwardly in a step by step motion.

A further object of this invention is the provision of means adapted to give a comparatively even pull to the device hitched to the tractors when the same is proceeding in a step by step motion.

A still further object of this invention is the provision of a tractor of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a plan view of a tractor constructed in accordance with my invention, Fig. 2 is a longitudinal sectional view of the same, illustrating the draft means, Fig. 3 is a similar view illustrating the manner of mounting the steppers, Fig. 4 is a fragmentary longitudinal sectional view, illustrating the specific construction of the equalizer, Fig. 5 is a fragmentary sectional view of a steering means, Fig. 6 is a detail view, illustrating a modified form of means of operating the steppers, Fig. 7 is a fragmentary transverse sectional view of the same, Fig. 8 is a transverse sectional view, illustrating specifically the manner of mounting the steppers to the frame of the tractor, and Fig. 9 is a fragmentary perspective view of a portion of the equalizer.

Referring in detail to the drawings, the numeral 1 indicates as an entirety a tractor frame consisting of relatively spaced hollow members 2 having cleats on their under faces and having their forward ends connected by members 3. A platform 5 is carried by the members 2, or frame 1, adjacent their rear ends, and is adapted to support the motive source of the tractor and also for aiding and holding the side members in their proper positions at their rear ends.

Steppers 6 are positioned between the members 2 and have their lower faces provided with corrugations or cleats so that they can readily obtain a traction upon the ground or surface on which the tractor is traveling. Bearings 7 are secured to the rear ends of the steppers 6 and have journaled therein shafts 8 carrying rollers 9 at each end thereof that travel within tracks 10 secured to the inner faces of the side members 2 adjacent their rear ends, whereby the rear ends of the steppers are slidably supported to the rear end of the frame. A drive shaft 11 is journaled in the frame 1 adjacent its forward end and is adapted to be driven by the propelling source located on the platform 5 in any well known manner. The drive shaft 11 is provided with cranks 12 that are journaled within enlarged portions 13 formed upon the forward ends of the steppers 6, so that upon rotation of the drive shaft, the steppers will be compelled to move upwardly, forwardly and downwardly. When the steppers move upwardly, forwardly and downwardly, they obtain an advance grip upon the ground or surface in relation to the frame and upon continuation of the rotation of the drive shaft the steppers being in engagement with the ground will cause the frame 1 to move upwardly, forwardly and downwardly, thereby compelling the tractor to move forwardly in a step by step motion.

The rear ends of the steppers 6 project beyond the rear end of the frame 1 and are connected together by a beam 14, which supports one end of a casing 15. The casing 15 has each end open and is provided upon its side walls with guides 16 to receive an elongated looped member 17 and which member is free to slide in relation to the casing 15. A rod 18 is formed upon the forward end of the loop member 17 and is slidably received within the bracket 19 carried by the frame 1.

Transversely extending bars 20 are carried by the loop member 17 adjacent each end and have rollers 20' journaled thereon over which travels an endless belt 21. The endless belt 21 is secured to the casing 15 and to one end of a sliding rod 23, as shown at 22, and which rod is carried by the frame 1. The forward end of the sliding rod 23 has an enlarged portion 24 provided with a substantially rectangular opening to receive an eccentric or cam 25 secured to the drive shaft. A guide rod 26 is formed upon the forward end of the enlarged portion 24 and is slidably received by a bracket 27 secured to the forward end of the frame. The casing 15 and sliding rod 23 are located within the intermediate member 2 and protected thereby. The device to be hauled by the tractor is coupled in any well known manner to the rear end of the elongated loop member 17 at a point illustrated at 28, and the eccentric or cam 25 is so located upon the drive shaft 11 that it will cause the elongated loop member 17 to continuously move forward when the steppers 6 are moving upwardly, forwardly and downwardly, and also when the frame is moving upwardly, forwardly and downwardly, so as to give an even pull to the device to which the tractor is attached. This even pull is formed through the operation of the cam and the endless belt 21 slidable upon the rollers 20' of the elongated loop member 17. The rear ends of the outer members 2 of the frame 1 have journaled therein vertically disposed shafts 30 to which bifurcated arms 31 are secured. Guiding wheels 32 are journaled between the arms 31 and are normally in engagement with the ground. Segments 33 are secured to the upper ends of the shafts 30 and mesh with worms 34 secured to the end of a steering shaft 35, which is provided with an ordinary steering wheel 36. whereby the tractor may be guided by turning first the wheels in one direction and then in the other.

Referring to my modified form of means for actuating the steppers it consists of plates 37, provided with elongated openings 38, and secured to the forward ends of the steppers. Upper and lower teeth 39 are formed upon one side edge of the openings 38, which are adapted to be engaged by teeth 40 formed upon eccentrically mounted gears 41. The gears 41 are eccentrically mounted upon the drive shaft 11 and have one-half of their peripheries smooth while their other half have the teeth 40 formed thereon. The gears are also reduced in thickness at the portions carrying the teeth so that said portions can readily mesh with the teeth 39 of the plates 37 while the smooth peripheries can ride upon the walls of the openings 38.

In operation, the teeth 40 engage the teeth 39 upon the lower portions of the plates 37, causing the frame 1 of the tractor to move upwardly, forwardly and downwardly then the gears occupy a position at the other ends of the slots 38 of the plates 37 from that shown in Fig. 6 and upon continuation of the rotation of the drive shaft, the teeth mesh with the teeth 39 and cause the steppers to move upwardly, forwardly and downwardly, thereby obtaining a fresh and advanced grip upon the surface or ground.

While I have shown and described the preferred embodiment of my invention, it will be understood that minor changes in construction, combination and arrangement of parts may be made without departing from the spirit and scope of the invention as claimed.

What I claim is:

1. A tractor comprising a frame, steppers connected to said frame, means actuating said steppers to move the frame forwardly, and an equalizer connected to the frame and to the device being moved by the tractor for giving an even pull thereon.

2. A tractor comprising a frame, steppers connected to said frame, means actuating said steppers to move said frame forwardly, a casing connected to said steppers and slidably supported by said frame, an elongated member slidable in said casing, a belt operable over said elongated member, means by which a device to be hauled may be connected to the elongated member, a rod slidable on said frame and connected to the belt, means connecting the belt to said casing, an elongated portion formed on said rod and having a rectangular opening, and a cam carried by said actuating means to give a continuous movement to the elongated member.

3. A tractor comprising a frame, steppers connected to said frame, propelling means for said steppers, an equalizing means associated with said frame and steppers and adapted to be connected to a device to be pulled, steering wheels carried by said frame and in engagement with the ground, and means operating said steering wheels to guide the tractor.

4. A tractor comprising a frame, steppers slidably connected to said frame, a drive shaft journaled in said frame, plates secured to said steppers and having elongated openings, upper and lower series of teeth formed on said plates, eccentrically mounted gears having teeth formed upon one-half of their peripheries and the other half of their peripheries smooth for moving the steppers upwardly, forwardly and downwardly and then moving the frame upwardly, forwardly and downwardly.

In testimony whereof I affix my signature in presence of two witnesses.

ARMAND A. TIBBITS.

Witnesses:
CHARLES A. BAUNAM,
ERICK ANDERSON.

Copies of this patent may be obtained for five cents each, by addressing the "Commissioner of Patents, Washington, D. C."